Jan. 4, 1927.
N. LAWSON
1,613,175
AUTOMOBILE SIGNAL
Filed July 14, 1924  2 Sheets-Sheet 1
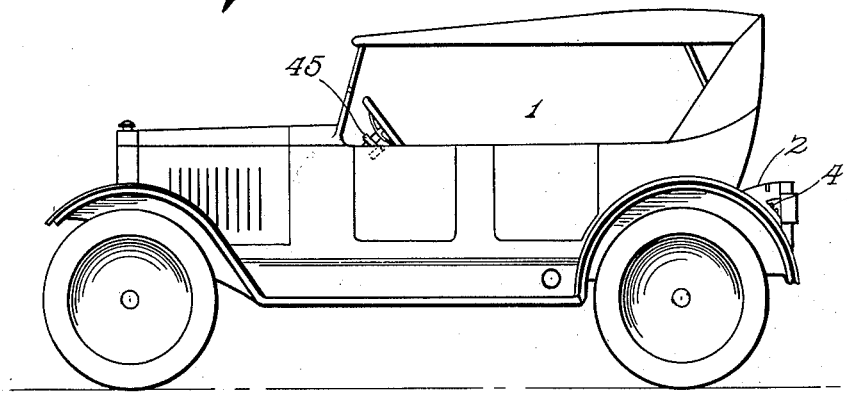
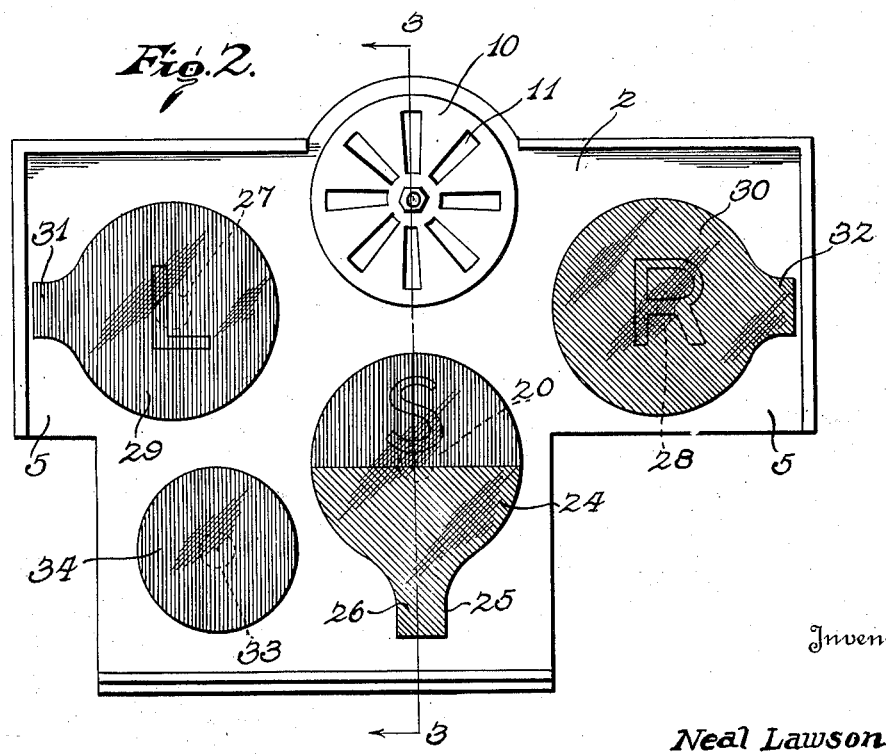
Inventor
Neal Lawson.
By Lacey & Lacey, Attorneys Jan. 4, 1927.  1,613,175
N. LAWSON
AUTOMOBILE SIGNAL
Filed July 14, 1924  2 Sheets-Sheet 2
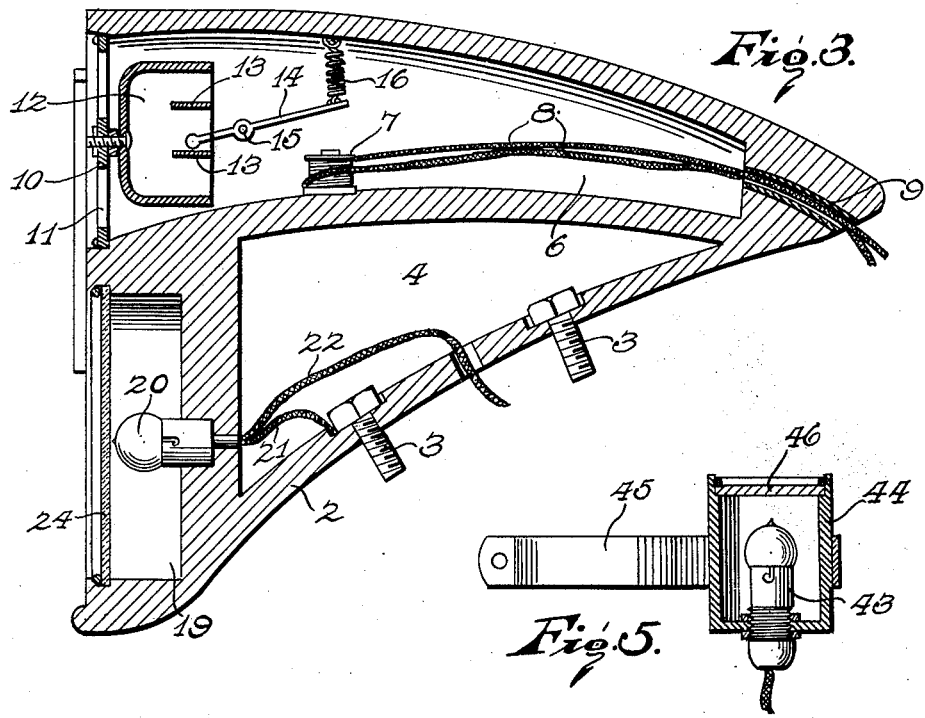
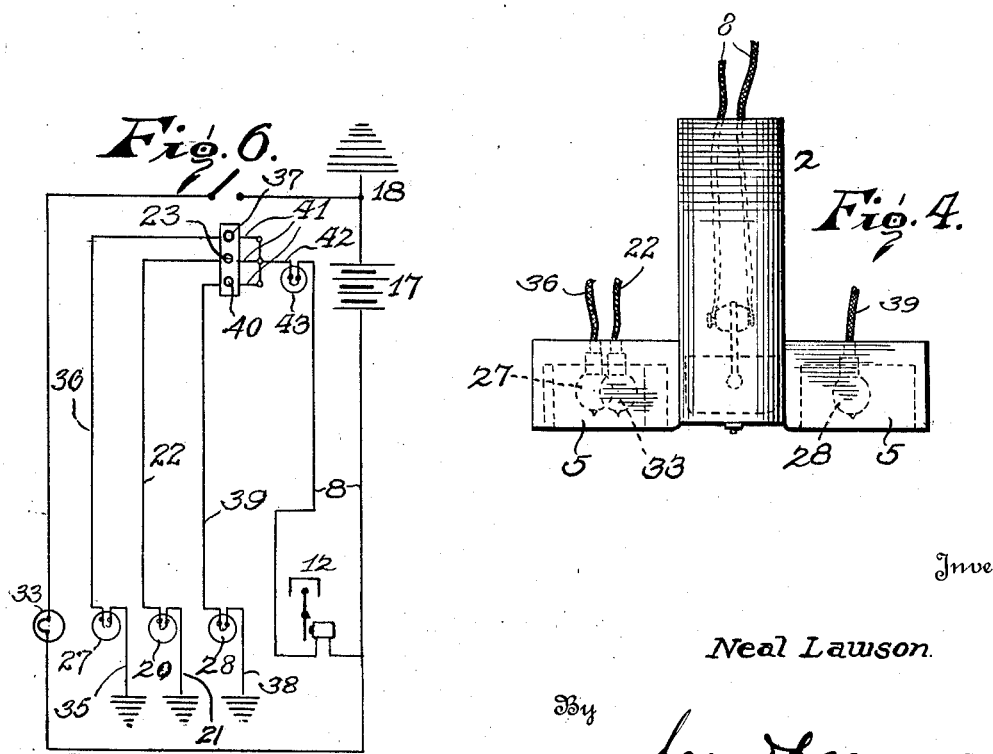
Inventor
Neal Lawson.
By
Lacey & Lacey, Attorneys Patented Jan. 4, 1927.

1,613,175

UNITED STATES PATENT OFFICE.

NEAL LAWSON, OF SANTA BARBARA, CALIFORNIA.

AUTOMOBILE SIGNAL.

Application filed July 14, 1924. Serial No. 726,045.

This invention is an automobile signal and is intended more particularly to display, at the rear of the automobile, signals which will indicate to a following vehicle an intention to turn to the right or to the left or to stop, and a further object of the invention is to combine with said visible signals an audible signal by which the attention of the following motorists will be attracted.

Another object of the invention is to combine in a compact arrangement signal lamps and a tail light so that the presence of the vehicle will be made known to all persons in rear of the same at night.

The invention also has for its object the provision of means whereby failure of the signals to operate properly will be instantly detected, and other objects of the invention will appear incidentally in the course of the following description.

The invention is illustrated in the accompanying drawings and consists in certain novel features which will be particularly pointed out in the claim.

In the drawings:

Figure 1 is a conventional side elevation of an automobile equipped with my present invention;

Fig. 2 is an enlarged rear elevation of the signal;

Fig. 3 is a longitudinal section on the line 3—3 of Fig. 2;

Fig. 4 is a plan view of the signal casing;

Fig. 5 is an enlarged detail sectional elevation of a test lamp which is provided in connection with the signals, and Fig. 6 is a diagrammatic view illustrating the electric connections between the several signals.

The automobile shown at 1 may be of any well-known or preferred type. In carrying out my invention, I provide a casing or signal frame 2 which is secured upon one of the rear mud guards, as shown in Fig. 1, or upon any other fixed part of the vehicle at the rear end of the same. The signal frame is preferably secured upon the mud guard, as shown and as stated, and to this end its base member is of an arcuate form, as shown in Fig. 3, bolts 3 being mounted in said base member to be engaged in the mud guard whereby to secure the frame in place. As shown at 4, the frame is preferably of an open formation so that the bolts 3 may be easily reached and manipulated and at its rear end the frame is provided with lateral wings 5, as shown in Figs. 2 and 4, the frame thus being T-shaped when viewed in plan. The stem of the T-shaped frame in its upper portion is hollow, as shown at 6, whereby it is adapted to house a magnet 7 and conductors 8 extending thereto, the front end of the frame being formed with a passage 9 to accommodate the said conductors. At the rear end of the hollow arm 6, I secure a cap plate 10 which has openings 11 therethrough and may be secured in the frame in any convenient manner. Upon the inner side of this cap plate, I secure a bell 12 which is illustrated as having spaced ribs or plates 13 upon its inner side at its front end which are adapted to be struck by the head of a clapper 14. The clapper 14 is pivoted within the frame between its ends, as shown at 15, and is normally held in the position shown in Fig. 3 by a retractile spring 16 secured to the front end of the clapper and to the frame. The front end of this clapper projects over the magnet 7 and the clapper constitutes the armature of the said magnet so that, when the magnet is energized, the clapper will be attracted and the bell sounded. One of the conductors 8 extends to a source of electric energy, indicated at 17, one side of which source is grounded, as indicated at 18. It will be obvious that a vibrating bell of a conventional construction may be substituted for the bell shown in Fig. 3 if so desired.

In the lower portion of the signal frame directly under the bell chamber is a recess or chamber 19 in which is mounted a lamp 20 fed by conductors 21 and 22, the conductor 21 being grounded through the frame, as shown in Fig. 3, and the conductor 22 extending to a control switch, indicated at 23, mounted upon the steering column or the instrument board of the vehicle. The chamber or recess 19 opens through the rear side of the signal frame and has fitted in its open side a lens or glass pane 24 which may be retained in position in any preferred manner and, as indicated in Fig. 2, has its upper and lower portions given contrasting colors. Upon the the upper portion of the lens or pane 24 is displayed the letter "S" indicating an intention to drive slowly or to stop and the lower portion of the recess or chamber is formed with a radial elongation, indicated at 25, the pane or lens having a depending tail 26 adapted to fit in the said elongation or notch and thereby serving to give notice when illuminated that the vehicle is not going to turn to one side but may be going to stop. It will be understood, of course, that the signal lamp 20 is normally not burning but when the signal is to be operated the lamp will be ignited so as to illuminate the signal chamber and thereby warn following motorists to observe care so as to avoid collision. In each wing 5 of the signal frame there is a chamber corresponding to the signal chamber 19 and each contains a lamp, indicated at 27 and 28, respectively. These lamps are fed by conductors passing through the back of the signal frame and the chambers have their rear open sides closed by lenses or panes 29 and 30, one of said lenses or panes being colored green and having the letter "L" displayed thereon, while the other is colored red and has the letter "R" displayed thereon. These indications, of course, notify following motorists or pedestrians of an intention to turn to the left or to the right, respectively, and they are constructed with tongues 31 and 32, respectively, which point in the directions indicated by the respective letters so that the intention of the chauffeur will be very clearly indicated.

The usual tail light, indicated at 33, is mounted in a chamber formed in the signal frame below one of the signals 27 or 28 and at the side of the signal chamber 19. This chamber is covered at its rear end by a lens 34 and the lamp mounted in said chamber is in a circuit independent of the other signal lamps.

The lamp 27 is connected to a conductor 35 which is grounded and also to a conductor 36 which extends to a switch 37 mounted adjacent the switch 23 previously mentioned. Likewise the lamp 28 is supplied through a conductor 38 which is grounded and a conductor 39 which extends to a switch 40 disposed adjacent and between the switches 23 and 37. From the several switches, conductors 41 extend to a common conductor 42 which passes through a test lamp 43 to which one conductor 8 is also connected. The test lamp 43 is thus arranged in series with the bell and with each one of the signal lamps. The test lamp is preferably mounted in a casing 44 which is secured by a bracket 45 upon the steering column of the vehicle, and this casing 44 is provided at its upper end with a lens 46 through which the lamp may be viewed by the operator but which will serve to a great extent to prevent accidental breakage of the lamp.

The operation of my improved signal will, it is thought, be readily understood from the foregoing description, taken in connection with the accompanying drawings. Assuming that the lamp 27 is to be illuminated and an intention to turn to the left thus indicated, the switch 37 is closed thereby setting up a circuit through the said lamp 27 and the conductors 8 to the battery or generator, the magnet 7 of the bell 12 being thereby energized and the test lamp 43 illuminated. A following motorist or a pedestrian will thus be given an audible signal through the bell as well as the visible signal through the lamp 27 so that he may exercise the necessary caution to avoid a collision. At the same time the operator is advised whether or not the signal is in proper working condition as, if it is not in such condition, the test lamp 43 will not be illuminated. Likewise, if either the switch 23 or the switch 40 be closed, the proper signal will be given at the rear of the vehicle, the bell sounded and the test lamp illuminated.

My improved signal is very compact in its arrangement and simple in construction and will be found highly efficient in use.

Having thus described the invention, I claim:

A direction signal adapted to be secured upon a mud guard of a vehicle and comprising a frame including a vertically disposed head portion having direction indicating means associated therewith and a horizontally disposed shank portion extending from the head portion intermediate its width and in spaced relation to its lower edge and formed with a signal receiving chamber, and a brace extending diagonally between the lower edge of said head portion and the free end of said shank and formed with openings to receive fasteners for securing the signal to the mud guard.

In testimony whereof I affix my signature.

NEAL LAWSON.